United States Patent [19]

Chaloner-Gill

[11] Patent Number: 5,491,040

[45] Date of Patent: Feb. 13, 1996

[54] DUAL PURPOSE LITHIUM SALT FOR ELECTROCHEMICAL CELLS

[76] Inventor: Benjamin Chaloner-Gill, 520 Mansion Ct., #303, Santa Clara, Calif. 95054

[21] Appl. No.: 414,874

[22] Filed: Mar. 31, 1995

Related U.S. Application Data

[63] Continuation-in-part of Ser. No. 73,910, Jun. 8, 1993, Pat. No. 5,411,820.

[51] Int. Cl.$^6$ .................................................. H01M 6/18
[52] U.S. Cl. ............................................ 429/192; 252/62.2
[58] Field of Search ........................... 429/192; 252/62.2; H01M 6/18

[56] References Cited

U.S. PATENT DOCUMENTS 5,262,253  11/1993  Golovin .................................. 429/192
5,273,840  12/1993  Dominen ................................ 429/192

*Primary Examiner*—John S. Maples

[57] ABSTRACT

This invention is directed to solid electrolytes containing a solvent and, in particular, a solvent comprising an alkali metal poly(oxyalkylene) sulfonate which functions as a source of ions for producing conductivity. The invention is also directed to electrochemical cells prepared from such solid electrolytes.

19 Claims, No Drawings

DUAL PURPOSE LITHIUM SALT FOR ELECTROCHEMICAL CELLS

This application is a continuation-in-part of application Ser. No. 08/073,910, filed Jun. 8, 1993, now U.S. Pat. No. 5,411,820.

FIELD OF THE INVENTION

This invention is directed to solid electrolytes containing a polymer matrix and an electrolyte solvent (plasticizer) for the polymer matrix. In particular, this invention is directed to solid electrolytes containing an alkali metal poly(oxyalkylene) alkane sulfonate, e.g., $RSO_2O(R^1O)_pLi$. The sulfonate can partially or completely replace the inorganic ion salt heretofore added to the electrolyte as a separate component in prior art electrolyte compositions.

BACKGROUND OF THE INVENTION

Electrochemical cells containing an anode, a cathode and a solid, solvent-containing electrolyte incorporating an inorganic ion salt are known in the art and are usually referred to as "solid batteries". These cells offer a number of advantages over electrochemical cells containing a liquid electrolyte (i.e., "liquid batteries") including improved safety features. Notwithstanding their advantages, the manufacture of these solid batteries requires careful process control to minimize the formation of impurities due to decomposition of the inorganic ion salt when forming the solid electrolyte. Excessive levels of impurities inhibit battery performance and can significantly reduce charge and discharge capacity.

Specifically, solid batteries employ a solid electrolyte interposed between a cathode and an anode. The solid electrolyte contains either an inorganic or an organic matrix and a suitable inorganic ion salt as a separate component.

Because of their expense and difficulty in forming into a variety of shapes, inorganic non-polymeric matrices are generally not preferred and the art typically employs a solid electrolyte containing a polymeric matrix. Nevertheless, an electrochemical cell containing a solid electrolyte with a polymeric matrix suffer from low ion conductivity and, accordingly, in order to maximize the conductivity of these materials, the matrix is generally constructed into a very thin film, i.e., on the order of about 25 to about 250 µm. As is apparent, the reduced thickness of the film reduces the total amount of internal resistance within the electrolyte thereby minimizing losses in conductivity due to internal resistance.

The solid electrolytes also contain a solvent (plasticizer) which, prior to the present invention, has been added to the matrix primarily in order to enhance the solubility of the inorganic ion salt in the solid electrolyte and thereby increase the conductivity of the electrochemical cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, tetraglyme, dimethylsulfoxide, dioxolane, sulfolane and the like.

Heretofore, the solid, solvent-containing electrolyte has typically been formed by one of two methods. In one method, the solid matrix is first formed and then a requisite amount of this material is dissolved in a volatile solvent. Requisite amounts of the inorganic ion salt and the electrolyte solvent (usually a glyme and the organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be laminated onto the solid electrolyte to form a solid battery (i.e., an electrochemical cell).

Regardless of which of the above techniques is used in preparing the solid electrolyte, a recurring problem has been the presence of impurities which interfere with cell function and can reduce battery life. The source of these impurities is the partial decomposition of the inorganic ion salt formed in the polymer matrix. Partial decomposition occurs due to exposure of the inorganic ion salts to the high temperatures used, for example, in forming the polymer matrix and/or in evaporating the volatile solvent. These high temperatures cause the salt to break down into insoluble or less soluble salts. For example, lithium hexafluorophosphate ($LiPF_6$) is converted to LiF, which is much less soluble in the electrolyte and can precipitate out. Such insoluble or less soluble salts cannot function to transfer electrons, and hence the resulting battery is rendered less efficient.

Thus, in preparing the solid electrolyte, great care must be taken to maintain processing temperatures below the threshold level for significant salt decomposition. The need for careful monitoring of process temperatures increases manufacturing costs and at the same time results in a percentage of the solid electrolyte produced being off specification due to unavoidable process temperature variation. Electrolyte material meeting production specifications generally contains small but tolerable levels of impurities which can nevertheless affect cell performance, particularly with respect to cumulative capacity. Cumulative capacity of a solid battery is defined as the summation of the capacity of the battery over each cycle (charge and discharge) in a specified cycle life.

Quite apart from the problem of decomposition is the cost of the inorganic ion salts. Simple salts such as lithium halides are less preferred in the electrolyte because they are not very soluble or can interfere in polymerization (e.g., LiI) and hence can precipitate out as mentioned above. More complex salts are favored because of their greater compatibility, but are more costly. A highly preferred salt is $LiPF_6$, but this salt has been found to be very heat sensitive and quite expensive. Another preferred salt is lithium hexafluoroarsenate ($LiAsF_6$). This salt poses significant disposal problems due to the presence of arsenic.

Notwithstanding their complexity and costs, even under the best of circumstances (e.g. impurity levels approaching zero), the inorganic ion salts typically have a transference number between 0.4 and 0.55, meaning that the ion salt carries only between 40% and 55% of the total plus (+) charge.

In view of the above, the art is searching for methods to reduce impurities in solid electrolyte manufacture as well as to increase the cumulative capacity of solid batteries employing such electrolytes.

SUMMARY OF THE INVENTION

The present invention is directed, in part, to the discovery that the use of certain lithium alkane sulfonates as a component of the solvent in solid, solvent-containing electrolytes provides for several benefits to the solid electrolyte manufacturing process as well as to the solid battery itself. In particular, the invention provides for reducing or eliminating the use of inorganic ion salts in preparing the solid electrolyte. In place of the inorganic salts, the solvent is at least partially composed of lithium poly(oxyalkylene) alkane sulfonate, or in general, an alkali metal poly(oxyalkylene) sulfonate.

By reducing the amount of, or completely eliminating, salt as a separate species within the electrolyte, a major source of impurities in electrolyte manufacture is removed. Manufacturing costs are also lowered since expensive, complex inorganic ion salts are no longer required.

Accordingly, in its composition aspects, this invention is directed to a solid, single-phase, solvent-containing electrolyte which comprises:

a solid polymeric matrix; and a solvent comprising an ionically conducting amount of an alkali metal poly(oxyalkylene) sulfonate having the formula:

$RSO_2O(R^1O)_pM$ where R is selected from the group consisting of alkyl and perfluoroalkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, fluoro, chloro and bromo;

$R^1$ is $(CR^3R^4)_q$ where $R^3$ and $R^4$ are independently selected from the group consisting of hydrogen and alkyl of from 1 to 4 carbon atoms, q being an integer of from 1 to 6, and wherein when q is greater than 1, $R^3$ and $R^4$ on each carbon atom may be the same or different;

M is a metal ion selected from the group consisting of lithium, sodium, and potassium ions; and p is an integer of from 2 to 6.

In another of its composition aspects, the present invention is directed to an electrochemical cell which comprises:

an anode;

a cathode; and interposed therebetween a single phase, solid solvent-containing electrolyte which comprises:

a solid polymeric matrix; and a solvent comprising an ionically conducting amount of an alkali metal poly(oxyalkylene) sulfonate having the formula:

$RSO_2O(R^1O)_pM$ where M, R and $R^1$ are as defined above and p is an integer from 2 to 6.

Preferably, the solid polymeric matrix is an organic matrix derived from a solid matrix forming monomer or partial polymer thereof.

In one of its method aspects, the present invention is directed to a method for enhancing the cumulative capacity of an electrochemical cell which comprises employing the solid, single-phase, solvent-containing electrolyte described above in the electrochemical cell.

DETAILED DESCRIPTION OF THE PREFERRED EMBODIMENTS

As noted above, this invention is directed to solid, solvent-containing electrolytes which, by virtue of the ion salt derivative employed, provide for higher purity in the electrolyte and lower electrolyte manufacturing costs. The reduction of impurities also provides for enhanced capacity of the solid battery. However, prior to describing this invention in further detail, the following terms will first be defined.

Definitions

As used herein, the following terms have the following meanings.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions).

Suitable solid polymeric matrices are well known in the art and include solid matrices formed from inorganic polymers, organic polymers or a mixture of polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical. Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrine, acryloyl-derivatized polyalkylene oxides (disclosed in U.S. Pat. No. 4,908,283, which is incorporated herein) urethane acrylate, vinyl sulfonate polyalkylene oxides (as disclosed in U.S. Pat. No. 5,262,253 and incorporated herein), acrylic acid, chloroacrylic acid, bromoacrylic acid, crotonic acid, propylene, ethylene and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et at., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones. Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, the alkali metal poly(oxyalkylene) alkane, electrolytic solvent and optionally an alkali salt can be applied to a substrate and then cured. Alternatively, the solid matrix forming monomer can be first cured and then dissolved into a suitable volatile solvent. Requisite amounts of the electrolytic solvent, the alkali metal poly(oxyalkylene) alkane, and optionally alkali salt can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "compatible electrolyte solvent," or in the context of components of the solid electrolyte, just "solvent," is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery.

Typical examples of solvent are mixtures of such materials as propylene carbonate, ethylene carbonate, gamma-butyrolactone, glyme, diglyme, triglyme, tetraglyme, dimethylsulfoxide, dioxolane, sulfolane, and the like. A particularly preferred solvent is disclosed in U.S. Pat. No. 5,262,253, which is incorporated herein.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $Li[N(SO_2CF_3)_2]$, $LiCF_3SO_3$, $LiPF_6$, $NaSCN$, and the like. The inorganic ion salt preferably contains at least one atom selected from the group consisting of Li, Na and K.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Particularly preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as a carbon black.

The cathode is typically comprised of a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated manganese oxides, e.g., $LiMn_2O_4$, lithiated nickel oxides, e.g., $LiNiO_2$, and the like.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like.

The term "organic carbonate" refers to hydrocarbyl carbonate compounds of no more than about 12 carbon atoms and which do not contain any hydroxyl groups. Preferably, the organic carbonate is a linear aliphatic carbonate or a cyclic aliphatic carbonate.

The term "poly(oxyalkylene) glycol" refers to a glycol having terminal hydroxyl groups. In forming the sulfonate from the poly(oxyalkylene) glycol, the poly(oxyalkylene) glycol is reacted with an alkali metal. In general, the poly(oxyalkylene) glycol has the formula $HO(R^1O)_pOH$ where R, $R^1$ and p are as defined above.

U.S. Pat. No. 5,411,820 the disclosure of which is incorporated herein in its entirely, discloses the alkali metal and dialkali metal salts of poly(oxyalkylene) glycol(ether) which are:

$RO(R^1O)_pM$; and $MO(R^1O)_pM$, respectively.

In the present invention, the dialkali metal salt, preferably, dilithium poly(oxyalkylene) glycol, i.e. $LiO(R^1O)_pLi$ is reacted with a sulfonyl chloride, e.g. an alkane sulfonyl chloride $RSO_2Cl$, to form the lithium poly(oxyalkylene) alkane sulfonate, as follows:

$LiO(R^1O)_pLi + RSO_2Cl \rightarrow RSO_2O(R^1O)_pLi + LiCl$

The sulfonyl chloride is itself obtainable as to reaction product of sulfonic acid and thionyl chloride as in:

$RSO_2OH + SOCl_2 \rightarrow RSO_2Cl + HCl + SO_2$

The dialkali metal poly(oxyalkylene) glycol is available as the product of the glycol and alkali metal. R, $R^1$ and p are as heretofore defined.

Preferably, the alkali metal is lithium, more preferably R is an alkane or perfluoro alkane of from 2 to 3 carbon atoms, and most preferably $R^1$ is —$CH_2CH_2$—, such that the preferred sulfonates of this invention include:

$CH_3SO_2O(CH_2CH_2O)_2Li$, $CF_3SO_2O(CH_2CH_2O)_3Li$, $C_2H_5SO_2O(CH_2CH_2O)_3Li$, $C_2F_5SO_2OCH_2CH_2OLi$, and so forth.

The term "glyme" refers to ethylene glycol dimethyl ether or $CH_3OCH_2CH_2OCH_3$. The term "a glyme" refers to glyme and also to diglyme, triglyme, tetraglyme, etc., which contain repeating units of —$(OCH_2CH_2)$—.

Methods for preparing solid, solvent-containing electrolytes are well known in the art. In one embodiment, however, this invention utilizes a particular solvent (plasticizer) mixture in the preparation of solid electrolytes which solvent mixture provides improvements in electrolyte manufacture and economics.

As noted above, organic carbonates are either commercially available or can be prepared by art recognized methods. Similarly, poly(oxyalkylene) glycol which can be reacted to form the sulfonate of Formula I above are also either commercially available or can be prepared by art recognized methods. For example, the preparation of $HO(CR^3R^4CR^3R^4)_pOH$ compounds, where $R^3$, $R^4$ and p are as defined above, can be readily prepared by reaction of an ethylene oxide derivative (an oxide derived from $CR^3R^4=CR^3R^4$ by conventional methods) under polymerization conditions. See, for example, U.S. Pat. No. 4,695,291 which is incorporated herein by reference.

In addition to the alkali metal poly(oxyalkylene) sulfonate, the solvent includes a glyme which can be formed by alkylation of the corresponding ethylene glycol ether. Such alkylation can be readily accomplished by known methods including, by way of example, treatment of the alkylene glycol(ether) with metallic sodium followed by addition of RCl, where R is as defined above.

In a preferred embodiment, the alkali metal poly(oxyalkylene) sulfonate completely replaces the inorganic ion salt of the prior art. However, partial replacement of the salt is also possible. Thus, in another preferred embodiment, less than 100%, but at least about 20% by weight of the salt (on a w/w basis for the same metal cation) is replaced by the sulfonate.

In a preferred embodiment, the process of forming an electrochemical cell comprises the steps of coating the surface of a cathode with a composition comprising at least one solid matrix forming monomer, an inorganic ion salt (if present) and the solvent mixture of an organic carbonate and a glyme compound together with the sulfonate of Formula I. The composition is then cured to provide for a solid electrolyte on the cathode surface. The anode is then laminated to this composite product.

The solid, solvent-containing electrolytes described herein are particularly useful in preparing solid electrochemical cells which are free of contamination by impurities from inorganic ion salt decomposition. In addition to reduced contamination from impurities, when all or part of the sulfonate in this invention is incorporated into the polymer matrix of the electrolyte, the charge transference is increased, resulting in improved cumulative capacity compared to solid, solvent-containing electrolytes in which only an inorganic ion salt is present.

The following Example illustrates a method of how an electrolytic cell could be fabricated.

EXAMPLE

A solid electrolytic cell is prepared by first preparing a cathodic slurry which is spread onto a current collector. An electrolyte solution is then placed onto the cathode surface and the cathode slurry and electrolyte solution are simultaneously cured to provide for a solid electrolyte composition. Similarly, an anode composition is placed on a current collector and then an electrolytic solution is placed onto the anode composition and both are cured to form a solid electrolytic composition. Thereafter, the anode and cathode are laminated so that the solid electrolyte composition, containing the alkali metal poly(oxyalkylene) alkane, is situated therebetween to provide for a solid electrolytic cell. The specifics of this construction are as follows:

A. The Cathode Current Collector

The cathode current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio. (Alternatively, aluminum mesh can be used as the current collector.)

The adhesion promoter layer is prepared as a dispersed colloidal solution in one of two methods. The first preparation of this colloidal solution for this example is as follows:

8.44 parts by weight of carbon powder (Shawinigan Black™— available from Chevron Chemical Company, San Ramon, Calif.)

33.76 parts by weight of a 25 weight percent solution of polyacrylic acid (a reported average molecular weight of about 90,000, commercially available from Aldrich Chemical Company—contains about 84.4 grams polyacrylic acid and 253.2 grams water)

57.80 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 µm. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil about 9 in. (22.86 cm) wide and about 0.0005 in. (0.00127 cm) to about 0.001 in. (0.00254 cm) thick. After application, the solvent is evaporated by placing the mixture/foil into a conventional oven. After evaporation, an electrically-conducting adhesion-promoter layer of about 4–6 µm in thickness is formed. The aluminum foil is then cut to about 8 in. (20.32 cm) wide by removing approximately ½ in. (1.27 cm) from the sides with a conventional slitter so as to remove any uneven edges; the foil can then be further cut to the desired size.

The second preparation of this colloidal solution comprises mixing 25 lbs (11.35 kg) of carbon powder (Shawinigan Black™) with 100 lbs (45.4 kg) of a 25 weight percent solution of polyacrylic acid (average molecular weight of about 240,000, commercially available from BF Goodrich, Cleveland, Ohio, as Good-Rite K702—contains about 25 lbs (11.35 kg) polyacrylic acid and 75 lbs (34.05 kg) water) and with 18.5 lbs (8.399 kg) of isopropanol. Stirring is done in a 30 gallon (113.55 liters) polyethylene drum with a gear-motor mixer (e.g., Lighting Lab master Mixer, model XJ-43, available from Cole-Parmer Instruments Co., Niles, Ill.) at 720 rpm with two 5 in. (12.7 cm) diameter A310-type propellers mounted on a single shaft. This wets down the carbon and eliminates any further dust problem. The resulting weight of the mixture is 143.5 lbs (65.149 kg) and contains some "lumps."

The mixture is then further mixed with an ink mill which consists of three steel rollers almost in contact with each other, turning at 275,300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 µm with the occasional 12.5 µm particles. The mixture can be stored for well over one month without the carbon settling out or reagglomerating.

When this composition is to be used to coat the current collector, an additional 55.5 lbs (25.197 kg) of isopropanol is mixed into the composition working with 5 gallon (18.925 l) batches in a plastic pail using an air powered shaft mixer (Dayton model 42231 available from Granger Supply Co., San Jose, Calif.) with a 4 in. (10.16 cm) diameter Jiffy-Mixer brand impeller (such as an impeller available as Catalog No. G-04541-20 from Cole Parmer Instrument Co., Niles, Ill.). Then, it is gear pumped through a 25 µm cloth filter (e.g., So-Clean Filter Systems, American Felt and Filter Company, Newburgh, N.Y.) and coated as described above.

B. The Cathode

The cathode is prepared from a cathodic slurry which, in turn, is prepared from a cathode powder as follows:

i. Cathode Powder

The cathode powder is prepared by combining 94.1±1.1 weight percent $LiMn_2O_4$ and 5.9±1.1 weight percent of carbon (Shawinigan Black™). About 100 grams of the resulting mixture is placed into a grinding machine (Attritor Model S-1 available from Union Process, Akron, Ohio) and ground for 30 minutes at 150 rpm. Afterwards, the resulting mixture is passed through a 200 mesh screen and then vacuum dried at 60° C. to produce a cathode powder with a water content of less than about 1000 ppm and preferably less than about 300 ppm.

ii. Cathode Slurry

A cathode slurry is prepared by combining sufficient cathode powder to provide for a final product having about 51.7 weight percent $LiMn_2O_4$. The slurry contains the following (in approximate weight percent):

| | |
|---|---|
| $LiMn_2O_4$ | 51.744% |
| Carbon | 6.456% |
| EPDM (ethylene propylene diene monomer) | 1.8% |
| Xylene | 40.0% |
| | 100% |

The method of preparing 100 grams of the cathode slurry is as follows:

1.8 grams of EPDM Mooney viscosity of 26±5 and available as VISTALON™ 2504 (Exxon Chemicals Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $LiMn_2O_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then coated to a substantially uniform thickness of about 25–200 µm, more preferably 50–100 µm, and most preferably about 100 µm, over the current collector by a doctor blade, Meyer-rod, or by reverse roll coating. The cathode slurry/current collector is heated to remove the xylene.

C. Electrolyte 36.26 grams of propylene carbonate, 3.45 grams of trimethyl propane triacrylate, 36.26 grams of ethylene carbonate, and 13.79 grams of urethane acrylate (Actilane SP023, available from Akcros Chemicals, Ltd., Manchester, England) are combined at room temperature until homogeneous. The resulting solution is optionally passed through a column of 4A molecular sieves to remove water and then the recovered solution is mixed at room temperature until homogeneous. If necessary, the ethylene carbonate can first be dissolved in propylene carbonate with heat.

At this point, 1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 8.77 grams of $CH_3SO_2O(CH_2CH_2O)_2Li$ are added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following in approximate weight percent based on the total weight of the electrolyte solution (100 g):

| | |
|---|---|
| Propylene Carbonate | 36.26% |
| Ethylene Carbonate | 36.26% |
| Trimethylol propane triacrylate (TMPTA) | 3.45% |
| Urethane Acrylate | 13.79% |
| $CH_3SO_2O(CH_2CH_2O)_2Li$ | 8.77% |
| PEO Film Forming Agent | 1.47% |
| Total | 100% |

This solution is then degassed to provide for an electrolyte solution wherein little, if any, of the $CH_3SO_2O(CH_2CH_2O)_2Li$ decomposes Optionally, the above solution which contains the prepolymer, the film forming agent, the electrolytic solvent and the $CH_3SO_2O(CH_2CH_2O)_2Li$ is filtered to remove any solid particles or gels remaining in the solution. One suitable filter device is a sintered stainless steel screen having a pore size between 1 and 50 μm at 100% efficiency.

In an alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and ethylene carbonate and dry the solution over 4A molecular sieves (Grade 514, 8-12 Mesh from Schoofs Inc., Moraga, Calif.) and then proceed to step 4.

2. Dry the propylene carbonate and ethylene carbonate over 4A molecular sieves (Grade 514, 8-12 Mesh from Schoofs Inc., Moraga, Calif.).

3. At room temperature, < 30° C., add the urethane acrylate to the solvent prepared in step 2. Stir until the resin is completely dissolved. The solution should be clear and colorless.

4. Dry and optionally sift the polyethylene oxide film forming agent through a 25 mesh mini-sieve commercially available as Order No. 57333-965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature (<30° C.).

5. After final addition of the polyethylene oxide film forming agent, stir to ensure that the film forming agent is substantially dispersed.

6. Heat the mixture to 68° to 75° C. and stir until the film forming agent has melted and the solution has become transparent. Optionally, in this step, the mixture is heated to 65° to 68° C.

7. Cool the solution produced in step 6 and when the temperature of the solution reaches 40° C., add the $CH_3SO_2O(CH_2CH_2O)_2Li$ very slowly making sure that the maximum temperature does not exceed 55° C. and preferably does not exceed about 40° C.

8. Thereafter, the complexing agent is added and the solution is stirred and degassed. The electrolyte solution is allowed to cool before usage.

9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is coated by a slot die coater or a reverse roll flexographic coater to a thickness of about 25–50 μm onto the surface of the dried cathode slurry described above.

D. The Anode Current Collector

The anode current collector employed is a sheet of copper foil, about 0.33 mils (8.5 μm) to 0.5 mils (12.7 μm) thick, having a layer of adhesion promoter attached to the surface of the foil which will contact the anode so as to form a composite having a sheet of copper foil, an anode and a layer of adhesion promoter interposed therebetween. (Alternatively, copper mesh can be used as the current collector.)

The same adhesion promoter composition used with the cathode is employed with the anode.

E. The Anode

The anode is prepared from an anodic slurry which, in turn, is prepared from an anode powder as follows:

i. Anode Powder

The anode powder is prepared by combining about 93.81 weight percent of Mitsubishi Gas Carbon™ (a coke-like material) (Mitsubishi Petroleum Co. Ltd, Tokyo, Japan) and about 6.19 weight percent of carbon (Shawinigan Black™). About 100 grams of the resulting mixture is placed into a grinding machine (Attritor Model S-1 ) and ground for 30 minutes at 150 rpm Afterwards, the resulting mixture is passed through a 200 mesh screen and then vacuum dried at 60° C. to produce an anode powder with a water content of less than about 1000 ppm and preferably less than about 300 ppm.

ii. Anode Slurry

An anode slurry is prepared by combining sufficient anode powder to provide for a final product having about 54.6 weight percent of the Mitsubishi Gas Carbon. The slurry contains the following (in approximate weight percent):

| | |
|---|---|
| Mitsubishi Gas Carbon | 54.6% |
| Carbon | 3.6% |
| EPDM (ethylene propylene diene monomer) | 1.8% |
| Xylene | 40.0% |
| | 100% |

The method of preparing 100 grams of the anode slurry is as follows:

1.8 grams of EPDM (VISTALON™2504) are mixed in 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of anode powder sufficient to provide 54.6 grams of Mitsubishi Gas Carbon per 100 grams of anode slurry and a sufficient amount of carbon (Shawinigan Black™) to provide 3.6 grams of total carbon per 100 grams of slurry are mixed in a double planetary mixer where the blend is stirred at 7.5 Hz and 25° C. The above EPDM-xylene solution is passed through 4A molecular sieves and then added to the Gas Carbon and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The so-prepared anode slurry can be placed onto the adhesion layer of the current collector by coating a layer of slurry having a substantially uniform thickness of about 25–200 μm, more preferably 50–100 μm, and most preferably about 50 μm, over the current collector by a doctor blade, Meyer-rod, or by reverse roll coating. The anode slurry/current collector is then heated to remove the xylene.

Afterwards, an electrolyte mixture is coated by a slot die coater or a reverse roll flexographic coater to a thickness of about 25–50 μm onto the surface of the dried anode slurry described above.

F. The Solid Electrolytic Cell

A sheet comprising a solid battery is prepared by laminating the electrolyte/anode composite with the electrolyte/cathode composite so that the electrolyte is positioned between the anode and cathode. Lamination is accomplished by minimal pressure.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A solid, single-phase, solvent-containing electrolyte which comprises:

a solid polymeric matrix; and a solvent comprising an ionically conducting amount of an alkali metal poly(oxyalkylene) sulfonate having the formula:

$$RSO_2O(R^1O)_pM$$

where R is selected from the group consisting of alkyl and perfluoroalkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, fluoro, chloro and bromo;

$R^1$ is $(CR^3R^4)_q$ where $R^3$ and $R^4$ are independently selected from the group consisting of hydrogen and alkyl of from 1 to 4 carbon atoms, q is an integer from 1 to 6, and wherein when q is greater than 1, the $R^3$ and $R^4$ on each carbon atom may be the same or different;

M is a metal ion selected from the group consisting lithium, sodium, and potassium ions; and p is an integer of from 2 to 6.

2. The solid, single-phase, solvent-containing electrolyte of claim 1, wherein the solvent also comprises an organic carbonate and a glyme, and wherein the weight ratio of organic carbonate to glyme is about 4:1.

3. The solid, single-phase, solvent-containing electrolyte of claim 1, wherein M is lithium and p is 3.

4. The solid, single phase, solvent-containing electrolyte of claim 1, wherein said sulfonate is $CH_3SO_2O(CH_2CH_2O)_3Li$ or $CF_3SO_2O(CH_2CH_2O)_3Li$.

5. The solid, single phase, solvent-containing electrolyte of claim 1, further including an inorganic ion salt.

6. An electrochemical cell which comprises:

an anode;

a cathode; and interposed therebetween a solid, solvent-containing electrolyte which comprises:

a solid polymeric matrix; and a solvent comprising an ion conducting amount of an alkali metal poly(oxyalkylene) sulfonate having the formula:

$$RSO_2O(R^1O)_pM$$

where R is selected from the group consisting of alkyl and perfluoroalkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, fluoro, chloro and bromo;

$R^1$ is $(CR^3R^4)_q$ where $R^3$ and $R^4$ are independently selected from the group consisting of hydrogen and alkyl of from 1 to 4 carbon atoms, q being an integer from 1 to 6 and wherein when q is greater than 1, the $R^3$ and $R^4$ on each carbon atom may be the same or different;

M is a metal ion selected from the group consisting of lithium, sodium, and potassium ions; and p is an integer of from 2 to 6.

7. The electrochemical cell of claim 6, wherein M is lithium and p is 3.

8. The electrochemical cell of claim 6, wherein said solvent also comprises a glyme and an organic carbonate in weight ratio of 1:4.

9. The electrochemical cell of claim 6, wherein said sulfonate is $CH_3SO_2O(CH_2CH_2O)_3Li$.

10. The electrochemical cell of claim 6, wherein said sulfonate is $CF_3SO_2O(CH_2CH_2O)_3Li$.

11. The electrochemical cell of claim 6 wherein said anode is an intercalation based anode comprising carbon.

12. The electrochemical cell of claim 11 wherein said cathode comprises cathodic material selected from the group consisting of vanadium oxides, lithiated cobalt oxides, lithiated manganese oxides, and mixtures thereof.

13. The electrochemical cell of claim 7 wherein said anode is an intercalation based anode comprising carbon.

14. The electrochemical cell of claim 13 wherein said cathode comprises cathodic material selected from the group consisting of vanadium oxides, lithiated cobalt oxides, lithiated manganese oxides, and mixtures thereof.

15. A battery comprising at least two electrochemical cells of claim 6.

16. The battery of claim 15 wherein said anode is an intercalation based anode comprising carbon.

17. The battery of claim 16 wherein said cathode comprises cathodic material selected from the group consisting of vanadium oxides, lithiated cobalt oxides, lithiated manganese oxides, and mixtures thereof.

18. The battery of claim 15 wherein M is lithium and p is 3.

19. The battery of claim 18 wherein said cathode comprises cathodic material selected from the group consisting of vanadium oxides, lithiated cobalt oxides, lithiated manganese oxides, and mixtures thereof.

* * * * *